United States Patent
Park et al.

(10) Patent No.: US 11,787,887 B2
(45) Date of Patent: Oct. 17, 2023

(54) METHOD OF PRODUCING VINYL CHLORIDE-BASED POLYMER

(71) Applicant: LG CHEM, LTD., Seoul (KR)

(72) Inventors: Jae Hyun Park, Daejeon (KR); Joong Chul Lim, Daejeon (KR); Hyun Min Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/779,256

(22) PCT Filed: Jul. 12, 2021

(86) PCT No.: PCT/KR2021/008893
§ 371 (c)(1),
(2) Date: May 24, 2022

(87) PCT Pub. No.: WO2022/014989
PCT Pub. Date: Jan. 20, 2022

(65) Prior Publication Data
US 2023/0002527 A1    Jan. 5, 2023

(30) Foreign Application Priority Data
Jul. 16, 2020   (KR) .................. 10-2020-0088220

(51) Int. Cl.
*C08F 214/06*    (2006.01)
(52) U.S. Cl.
CPC .................. *C08F 214/06* (2013.01)
(58) Field of Classification Search
CPC .................. C08F 241/06; C08F 14/06
USPC ....................................... 526/345
See application file for complete search history.

(56) References Cited

U.S. PATENT DOCUMENTS

| | | | |
|---|---|---|---|
| 4,031,297 A | 6/1977 | Smith | |
| 5,342,910 A * | 8/1994 | Kling | C08F 6/003 526/195 |
| 5,378,780 A * | 1/1995 | Kruse | C08J 9/103 526/225 |
| 2006/0173146 A1* | 8/2006 | Ooura | C08F 14/06 526/341 |
| 2009/0281255 A1 | 11/2009 | Dirix et al. | |
| 2017/0291974 A1* | 10/2017 | Ahn | C08F 222/14 |

FOREIGN PATENT DOCUMENTS

| | | |
|---|---|---|
| CN | 102648220 A | 8/2012 |
| CN | 107075029 A | 8/2017 |
| CN | 108976336 A | 12/2018 |
| JP | 58134103 A * | 8/1983 |
| JP | S58-134103 A | 8/1983 |
| JP | 61130315 A * | 6/1986 |
| JP | S61-130315 A | 6/1986 |
| JP | 63125507 A * | 5/1988 |
| JP | S63-125507 A | 5/1988 |
| JP | 03041103 A * | 2/1991 |
| JP | H0341103 A | 2/1991 |
| JP | H06-018827 B2 | 3/1994 |
| JP | H10-120707 A | 5/1998 |
| KR | 10-1999-0069229 A | 9/1999 |
| KR | 10-2008-0106235 A | 12/2008 |
| KR | 10-2010-0023340 A | 3/2010 |
| KR | 10-2017-0000256 A | 1/2017 |
| WO | 2005/063824 A1 | 7/2005 |
| WO | 2014/054413 A1 | 4/2014 |

OTHER PUBLICATIONS

Office Action and Search Report issued in corresponding CN Patent Application No. 202180006858.7, dated Feb. 11, 2023.
International Search Report (with partial translation) and Written Opinion dated Oct. 26, 2021, for corresponding International Patent Application No. PCT/KR2021/008893.
Extended European Search Report issued in corresponding European Patent Application No. 21841745.9, dated Apr. 28, 2023. 1 (Note: D1 to D5 cited therein were cited in an earlier-filed SB08 and indicated as having been considered by Examiner Bernshteyn.).

* cited by examiner

*Primary Examiner* — Michael M. Bernshteyn
(74) *Attorney, Agent, or Firm* — Morgan, Lewis & Bockius LLP

(57) ABSTRACT

Provided is a method of producing a vinyl chloride-based polymer including adding a vinyl chloride monomer and a monomer represented by Chemical Formula 1 to a reactor and performing polymerization, wherein an input amount of the monomer represented by Chemical Formula 1 is 1 to 4 parts by weight based on 100 parts by weight of the vinyl chloride monomer, and the monomer represented by Chemical Formula 1 is continuously added to the reactor.

9 Claims, No Drawings

METHOD OF PRODUCING VINYL CHLORIDE-BASED POLYMER

CROSS-REFERENCE TO RELATED APPLICATION

This application claims priority to and the benefit of Korean Patent Application No. 10-2020-0088220, filed on Jul. 16, 2020, the disclosure of which is incorporated herein by reference in its entirety.

TECHNICAL FIELD

The present invention relates to a method of producing a vinyl chloride-based polymer, and more particularly, to a method of producing a vinyl chloride-based polymer with improved fusibility.

BACKGROUND ART

Vinyl chloride-based polymers produced by polymerizing vinyl chloride monomers as a main component are the most widely used synthetic resins among thermoplastic resins.

Vinyl chloride-based polymers can be produced by suspension polymerization, emulsion polymerization, and bulk polymerization. Among these, in the case of suspension polymerization, a final polymerization conversion rate is high and operating costs are low, it is easy to recover unreacted monomers after polymerization is completed, maintenance is easy because of a small amount of scale accumulation in a polymerization reactor due to a coating system, and mass production is possible.

Meanwhile, in order to process a vinyl chloride-based polymer into a final product, it is necessary to extrude the polymer after adding various additives thereto. In this case, when the fusion of the mixture proceeds rapidly, since the chains of the vinyl chloride-based polymer are easily disentangled and form a strong bond with each other, the mechanical properties of the final product are improved.

However, when the fusion proceeds slowly, since the chains of the vinyl chloride-based polymer cannot be disentangled, non-gelling particles are formed, and since these non-gelling particles act as defects in a final product, the mechanical properties of the final product may be degraded.

Accordingly, there have been continuous research efforts to improve fusibility when adding additives to a vinyl chloride-based polymer.

DISCLOSURE

Technical Problem

The present invention is directed to improving fusibility without affecting the thermal stability and polymerization time of a vinyl chloride-based polymer.

Technical Solution

One aspect of the present invention provides a method of producing a vinyl chloride-based polymer including adding a vinyl chloride monomer and a monomer represented by the following Chemical Formula 1 to a reactor and performing polymerization, wherein an input amount of the monomer represented by the Chemical Formula 1 is from 1 to 4 parts by weight based on 100 parts by weight of the vinyl chloride monomer, and the monomer represented by the Chemical Formula 1 is continuously added to the reactor:

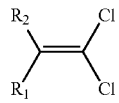

<Chemical Formula 1>

In the above Chemical Formula 1, $R_1$ and $R_2$ are each independently a hydrogen or a $C_1$ to $C_{10}$ alkyl group.

Advantageous Effects

According to a method of producing a vinyl chloride-based polymer of the present invention, it is possible to produce a vinyl chloride-based polymer with improved fusibility while maintaining the thermal stability and polymerization time of the vinyl chloride-based polymer at the same levels as those of conventional vinyl chloride-based polymers.

MODES OF THE INVENTION

Hereinafter, the present invention will be described in more detail to help the understanding of the present invention.

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

The term "polymerization conversion rate" can be calculated by the following equation.

Polymerization conversion rate (%)={(Total weight of monomers added until polymerization is terminated)−(Total weight of unreacted monomers at the time of measuring polymerization conversion rate)}/(Total weight of monomers added until polymerization is terminated)×100

Method of Producing Vinyl Chloride-Based Polymer

According to one embodiment of the present invention, a method of producing a vinyl chloride-based polymer includes adding a vinyl chloride monomer and a monomer represented by the following Chemical Formula 1 to a reactor and performing polymerization, wherein an input amount of the monomer represented by the Chemical Formula 1 is from 1 to 4 parts by weight based on 100 parts by weight of the vinyl chloride monomer, and the monomer represented by the Chemical Formula 1 is continuously added to the reactor:

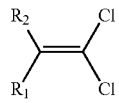

<Chemical Formula 1>

In the above Chemical Formula 1, $R_1$ and $R_2$ are each independently a hydrogen or a $C_1$ to $C_{10}$ alkyl group.

The input amount of monomer represented by the Chemical Formula 1 may be from 1 to 4 parts by weight and preferably from 2 to 3 parts by weight based on 100 parts by weight of the vinyl chloride monomer. Due to having lower reactivity than the vinyl chloride monomer, the monomer represented by the Chemical Formula 1 can lower a polymerization rate and increase a polymerization time. However, when the above-described amount of monomer represented by the Chemical Formula 1 is added, a vinyl chloride-based polymer having improved fusibility can be produced, and a decrease in polymerization rate and an increase in polymerization time can be minimized. On the other hand, when the monomer represented by the Chemical Formula 1 is not added or added in an amount less than the above-described amount, the fusibility of a vinyl chloride-based polymer cannot be improved. In addition, when more than the above-described amount of monomer represented by Chemical Formula 1 is added, since a polymerization rate is significantly reduced, the polymerization time is greatly increased. In addition, the thermal stability of a produced vinyl chloride-based polymer is significantly reduced.

In addition, when the monomer represented by the Chemical Formula 1 is continuously added, since the concentration of the monomer represented by the Chemical Formula 1 is maintained low while polymerization is carried out in a polymerization reactor, a decrease in polymerization rate and an increase in polymerization time due to the monomer represented by the Chemical Formula 1 can be minimized.

On the other hand, when the monomer represented by the Chemical Formula 1 is batch-added before the initiation of polymerization, since a polymerization rate is decreased, a polymerization time is greatly increased. In addition, the thermal stability of a produced vinyl chloride-based polymer is reduced.

The time point at which the continuous addition of the monomer represented by the Chemical Formula 1 is started may be a time point at which a polymerization conversion rate is in a range of from 0.0% to 10.0% and preferably from 0.0% to 5.0%. In addition, the time point at which the continuous addition of the monomer represented by the Chemical Formula 1 ends may be a time point at which a polymerization conversion rate of from 60.0% to 80.0% and preferably from 65.0% to 75.0% is reached. When the above conditions are satisfied, since the monomer represented by the Chemical Formula 1 is continuously added from the initial stage of polymerization to the end of polymerization, the concentration of the monomer represented by the Chemical Formula 1 in a polymerization reaction can be maintained low. In this way, the decrease in polymerization rate, increase in polymerization time, and decrease in thermal stability due to the monomer represented by the Chemical Formula 1 can be minimized.

The monomer represented by the Chemical Formula 1 may be one or more selected from the group consisting of 1,1-dichloroethylene, 1,1-dichloro-1-propylene, 1,1-dichloro-1-butene, 1,1-dichloro-1-pentene, 1,1-dichloro-1-hexene, 1,1-dichloro-1-heptene, 1,1-dichloro-1-octene, and 1,1-dichloro-1-nonene and is preferably 1,1-dichloroethylene.

The vinyl chloride monomer may be batch-added to the reactor before the initiation of polymerization for process convenience, or may be dividedly added before polymerization and during polymerization to improve productivity.

Meanwhile, the polymerization may be suspension polymerization.

The suspension polymerization may be carried out in the presence of an initiator, a dispersant, and an aqueous solvent.

The initiator may be one or more selected from the group consisting of dicumyl peroxide, dipentyl peroxide, di(3,5,5-trimethylhexanoyl)peroxide, dilauroyl peroxide, diisopropyl peroxydicarbonate, di-sec-butyl peroxydicarbonate, di(2-ethylhexyl)peroxydicarbonate, t-butyl peroxyneodecanoate, t-butyl peroxyneoheptanoate, t-amyl peroxyneodecanoate, cumyl peroxyneodecanoate, cumyl peroxyneoheptanoate, 1,1,3,3-tetramethylbutyl peroxyneodecanoate, azobis-2,4-dimethylvaleronitrile, potassium persulfate, and ammonium persulfate.

The dispersant may be one or more selected from the group consisting of polyvinyl alcohol, partially saponified oil-soluble polyvinyl alcohol, polyacrylic acid, a copolymer of vinyl acetate and maleic anhydride, hydroxypropyl methylcellulose, gelatin, calcium phosphate, hydroxyapatite, sorbitan monolaurate, sorbitan trioleate, polyoxyethylene, sodium lauryl sulfate, sodium dodecylbenzenesulfonate, and dioctyl sodium sulfosuccinate.

The aqueous solvent may be one or more selected from the group consisting of distilled water and ion-exchanged water.

The polymerization may be terminated when a polymerization conversion rate of from 85.0% to 95.0% and preferably from 85.0% to 90.0% is reached. When the above condition is satisfied, the monomer represented by the Chemical Formula 1 added in the second half of polymerization can sufficiently participate in the polymerization.

When the polymerization is completed, a step of removing unreacted monomers through stripping and dehydration may be additionally performed.

Hereinafter, exemplary embodiments will be presented to help the understanding of the present invention, but it will be apparent to those skilled in the art that the exemplary embodiments are merely illustrative of the present invention, and various changes and modifications are possible within the scope and technical spirit of the present invention, and such variations and modifications fall within the scope of the appended claims.

EXAMPLES

Examples 1 to 6 and Comparative Examples 1 to 7

To a stainless polymerization reactor having an internal volume of 1 $m^3$ and equipped with a reflux condenser and a stirrer, 130 parts by weight of ion-exchanged water, 0.05 parts by weight of polyvinyl alcohol having a degree of hydration of 88%, 0.02 parts by weight of polyvinyl alcohol having a degree of hydration of 72%, 0.015 parts by weight of polyvinyl alcohol having a degree of hydration of 55%, 0.0005 parts by weight of hydroxypropyl methylcellulose, and 0.088 parts by weight of t-butyl peroxyneodecanoate were added. Subsequently, the inside of the polymerization reactor was degassed with a vacuum pump while stirring the reactor contents. Then, after batch-adding 100 parts by weight of vinyl chloride monomers to the polymerization reactor, polymerization was performed while adding or not adding 1,1-dichloroethylene under the conditions shown in Tables 1 and 2 below while maintaining the internal temperature of the polymerization reactor at 57.2° C. The polymerization was terminated when the pressure of the polymerization reactor in which the polymerization was performed differed from the pressure of the polymerization reactor in the initial stage of polymerization by 1.0 $kg/cm^2$. After adding 0.05 parts by weight of triethylene glycol bis(3-tert-butyl-4-hydroxy-5-methylphenyl)propionate to the polymerization reactor, unreacted monomers and a polymerization slurry were separately recovered from the polymerization reactor. Subsequently, the polymerization slurry was stripped and dehydrated to recover unreacted monomers and moisture, and then dried with hot air in a fluidized bed dryer to obtain a vinyl chloride-based polymer.

Experimental Example 1

Polymerization conversion rates of the vinyl chloride-based polymers of Examples and Comparative Examples were calculated as follows, and the results are shown in Tables 1 and 2 below.

Polymerization conversion rate (%)={(Total weight of vinyl chloride monomers and 1,1-dichloroethylene monomers added until polymerization was terminated)−(Total weight of unreacted vinyl chloride monomers and 1,1-dichloroethylene monomers at the time of measuring polymerization conversion rate)}/(Total weight of vinyl chloride monomers and 1,1-dichloroethylene monomers added until polymerization was terminated)×100

Experimental Example 2

Thermoplastic resin compositions were prepared by adding 100 parts by weight of the vinyl chloride-based copolymers of Examples and Comparative Examples, 5 parts by weight of a Ca—Zn-based stabilizer (NH390P manufactured by Dansuk), 7 parts by weight of CPE7000 (manufacturer: Sundow Polymers (WEIPREN®)), and 12 parts by weight of $CaCO_3$ to a mixer (HMF-3100S manufactured by Hanil Electric) and mixing the same for six minutes. A property of the thermoplastic resin compositions was measured by a method described below, and the results are shown in Tables 1 and 2 below.

Fusion time (seconds): Each of the thermoplastic resin compositions was added to a Brabender Plastograph mixer, and a fusion time was measured for six minutes under 165° C. and 45 rpm conditions.

Experimental Example 3

The thermoplastic resin compositions prepared in Experimental Example 2 were extruded with a twin-screw extruder (manufacturer: Brabender Technologie), and the extruded products were prepared as specimens using a specimen cutter. A property of the specimens was measured by a method described below, and the results are shown in Tables 1 and 2 below.

Tensile yield strength (MPa): The tensile yield strength of the specimens was measured with a tensile strength meter (Zwick-ZO10 manufactured by ZwickRoell) in accordance with ASTM D638.

Experimental Example 4

Sheets were formed by roll-milling mixtures prepared by stirring 100 parts by weight of the vinyl chloride-based copolymers of Examples and Comparative Examples, 0.7 parts by weight of a Sn-based stabilizer (MT800 manufactured by Songwon), 1.8 parts by weight of $TiO_2$, and 1 part by weight of a processing aid (PA910 manufactured by LG Chem) for one minute, wherein the roll-milling was carried out for five minutes at 185° C. A property of the sheets was measured by a method described below, and the results are shown in Tables 1 and 2 below.

Whiteness: Whiteness was measured with a spectrophotometer (CM-700d manufactured by Konica Minolta) and characterized according to the CIE 1976 color coordinates ($L^*$, $a^*$, $b^*$). Higher whiteness values indicate better thermal stability.

TABLE 1

| Classification | | Example 1 | Example 2 | Example 3 | Example 4 | Example 5 | Example 6 |
|---|---|---|---|---|---|---|---|
| 1,1-Dichloroethylene | Input amount (parts by weight) | 1.0 | 2.0 | 3.0 | 4.0 | 4.0 | 4.0 |
| | Input method | Continuous | Continuous | Continuous | Continuous | Continuous | Continuous |
| | Input start time (polymerization conversion rate, %) | 0.0 | 0.0 | 0.0 | 0.0 | 0.0 | 11.0 |
| | Input end time (polymerization conversion rate, %) | 70.0 | 70.0 | 70.0 | 70.0 | 81.0 | 70.0 |
| Total polymerization time (minutes) | | 172 | 176 | 181 | 187 | 171 | 198 |
| Final polymerization conversion rate (%) | | 85.6 | 85.5 | 85.2 | 85.7 | 85.8 | 86.0 |
| Thermoplastic resin composition | Fusion time | 158 | 145 | 128 | 112 | 142 | 118 |
| Specimen | Tensile yield strength | 38.9 | 39.4 | 39.8 | 40.3 | 40.1 | 39.9 |
| Sheet | Whiteness | 72.8 | 72.9 | 73.1 | 72.5 | 72.6 | 71.0 |

TABLE 2

| Classification | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| 1,1-Dichloroethylene | Input amount (parts by weight) | 0.0 | 1.0 | 4.0 | 7.0 | 0.5 | 4.5 | 7.0 |
| | Input method | — | Batch-added | Batch-added | Batch-added | Continuous | Continuous | Continuous |
| | Input start time (polymerization conversion rate, %) | — | — | — | — | 0.0 | 0.0 | 0.0 |
| | Input end time (polymerization conversion rate, %) | — | — | — | — | 70.0 | 70.0 | 70.0 |

TABLE 2-continued

| Classification | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Total polymerization time (minutes) | | 170 | 217 | 283 | 524 | 172 | 204 | 277 |
| Final polymerization conversion rate | | 85.2 | 85.3 | 85.9 | 85.4 | 85.5 | 86.0 | 85.4 |
| Thermoplastic resin composition Specimen | Fusion time | 176 | 160 | 119 | 90 | 174 | 116 | 88 |
| | Tensile yield strength | 37.2 | 37.9 | 39.7 | 38.1 | 37.3 | 40.0 | 37.9 |
| Sheet | Whiteness | 73.0 | 71.1 | 69.2 | N.D | 72.8 | 69.7 | 69.4 |

Referring to the above Tables 1 and 2, Examples 1 to 6, which were produced by continuously adding 1 to 4 parts by weight of 1,1-dichloroethylene, had a high final polymerization conversion rate although a total polymerization time was not excessively increased as compared to Comparative Example 1 produced without adding 1,1-dichloroethylene. In addition, Examples 1 to 6 had a shorter fusion time and a more improved tensile yield strength than Comparative Example 1. On the other hand, when Examples 4 to 6 were compared, Example 4, which was produced by continuously adding 1,1-dichloroethylene from a time point at which a polymerization conversion rate was 0.0% to a time point at which a polymerization conversion rate of 70.0% was reached, had a shorter a fusion time than Example 5 produced by continuously adding 1,1-dichloroethylene from a time point at which a polymerization conversion rate was 0.0% to a time point at which a polymerization conversion rate of 81.0% was reached. In addition, Example 4 had excellent tensile yield strength and whiteness as compared to Example 6 produced by continuously adding 1,1-dichloroethylene from a time point at which a polymerization conversion rate was 11.0% to a time point at which a polymerization conversion rate of 70.0% was reached. When Example 1 and Comparative Example 2 were compared, Example 1, which was produced by continuously adding 1 part by weight of 1,1-dichloroethylene, had a significantly shorter total polymerization time than Comparative Example 2 produced by batch-adding 1 part by weight of 1,1-dichloroethylene. Example 1 had a shorter fusion time and higher tensile yield strength and whiteness than Comparative Example 2.

When Example 4 and Comparative Example 3 are compared, Example 4, which was produced by continuously adding 4 parts by weight of 1,1-dichloroethylene, had a significantly shorter total polymerization time than Comparative Example 3 produced by batch-adding 4 parts by weight of 1,1-dichloroethylene. Example 4 had a shorter fusion time and higher tensile yield strength and whiteness than Comparative Example 3.

When Comparative Examples 4 and 7 were compared, Comparative Example 7, which was produced by continuously adding 7 parts by weight of 1,1-dichloroethylene, had a significantly shorter total polymerization time than Comparative Example 4 produced by batch-adding 7 parts by weight of 1,1-dichloroethylene. In addition, the thermal stability of Comparative Example 4 was so low that whiteness could not be measured.

Comparative Example 5, which was produced by continuously adding 0.5 parts by weight of 1,1-dichloroethylene, had a significantly longer fusion time than Examples 1 to 6, and tensile yield strength was not improved.

Comparative Example 6, which was produced by continuously adding 4.5 parts by weight of 1,1-dichloroethyl-ene, had a significantly longer total polymerization time and lower whiteness than Examples 1 to 6.

The invention claimed is:

1. A method of producing a vinyl chloride-based polymer, comprising adding a vinyl chloride monomer and a monomer represented by the following Chemical Formula 1 to a reactor and performing polymerization,
wherein an input amount of the monomer represented by the Chemical Formula 1 is from 1 part by weight to 4 parts by weight based on 100 parts by weight of the vinyl chloride monomer, and the monomer represented by the Chemical Formula 1 is continuously added to the reactor:

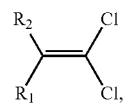

<Chemical Formula 1> wherein, in the above Chemical Formula 1, $R_1$ and $R_2$ are each independently a hydrogen or a $C_1$ to $C_{10}$ alkyl group.

2. The method of claim 1, wherein the input amount of the monomer represented by the Chemical Formula 1 is from 2 parts by weight to 3 parts by weight based on 100 parts by weight of the vinyl chloride monomer.

3. The method of claim 1, wherein a time point at which the continuous addition of the monomer represented by the Chemical Formula 1 is started is a time point at which a polymerization conversion rate is in a range of from 0.0% to 10.0%.

4. The method of claim 1, wherein a time point at which the continuous addition of the monomer represented by the Chemical Formula 1 is started is a time point at which a polymerization conversion rate is in a range of from 0.0% to 5.0%.

5. The method of claim 1, wherein a time point at which the continuous addition of the monomer represented by the Chemical Formula 1 ends is a time point at which a polymerization conversion rate of from 60.0% to 80.0% is reached.

6. The method of claim 1, wherein a time point at which the continuous addition of the monomer represented by the Chemical Formula 1 ends is a time point at which a polymerization conversion rate of from 65.0% to 75.0% is reached.

7. The method of claim 1, wherein the monomer represented by the Chemical Formula 1 is one or more selected from the group consisting of 1,1-dichloroethylene, 1,1-dichloro-1-propylene, 1,1-dichloro-1-butene, 1,1-dichloro-1-pentene, 1,1-dichloro-1-hexene, 1,1-dichloro-1-heptene, 1,1-dichloro-1-octene, and 1,1-dichloro-1-nonene.

8. The method of claim 1, wherein the polymerization is suspension polymerization.

9. The method of claim 1, further comprising terminating the polymerization when a polymerization conversion rate of from 85.0% to 95.0% is reached.

* * * * *